United States Patent [19]

Marietta

[11] 3,902,320

[45] Sept. 2, 1975

[54] MOBILE POWER STEERING SYSTEM
[75] Inventor: Walter E. Marietta, Mentor, Ohio
[73] Assignee: Parker-Hannifin Corporation, Cleveland, Ohio
[22] Filed: Sept. 5, 1974
[21] Appl. No.: 503,275

[52] U.S. Cl. .................. 60/445; 60/447; 60/450; 417/212
[51] Int. Cl.² ................. F16H 39/46; F15B 15/18
[58] Field of Search ............ 60/445, 447, 448, 450, 60/452, 468, 494; 417/212, 222

[56] References Cited
UNITED STATES PATENTS

| | | | |
|---|---|---|---|
| 2,892,312 | 6/1959 | Allen et al. | 60/468 X |
| 3,444,689 | 5/1969 | Budzich | 60/445 X |
| 3,726,093 | 4/1973 | Malott | 60/445 |

Primary Examiner—Edgar W. Geoghegan
Attorney, Agent, or Firm—Donnelly, Maky, Renner & Otto

[57] ABSTRACT

A mobile power steering system for a log skidder, a fork lift truck or like vehicle including a steering cylinder, a steering control valve defining a variable area orifice, a pressure compensated variable displacement pump having a modulator which senses the pressure drop across such variable area orifice to operate the fluid pressure actuated pump displacement varying piston, and a remote source of fluid pressure such as a ground driven fixed displacement pump which varies the spring load on the modulator to provide for maximum steering response or ratio at zero or slow ground speed of the vehicle and a progressively decreasing steering ratio at progressively increasing ground speed of the vehicle.

8 Claims, 4 Drawing Figures

PATENTED SEP 2 1975
3,902,320
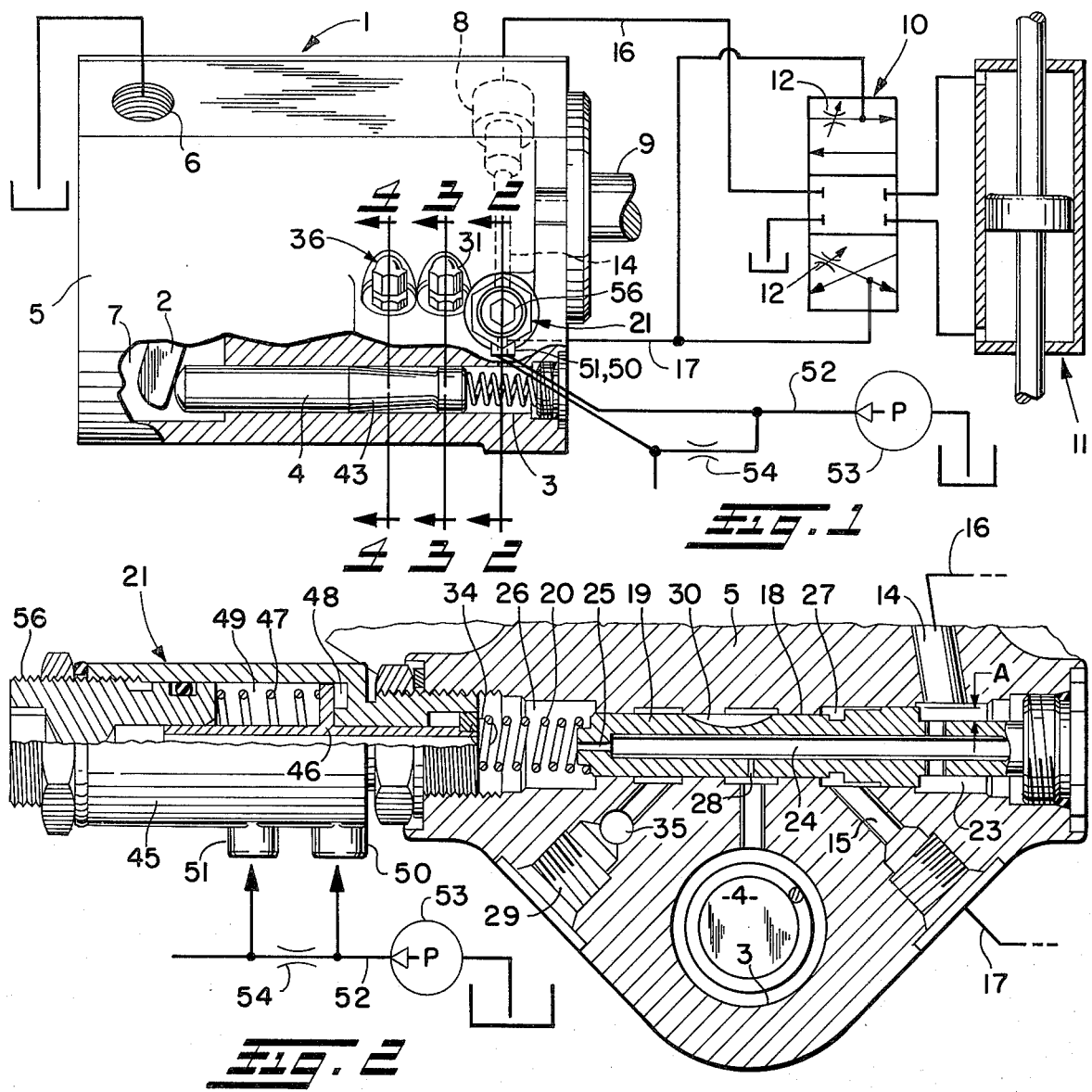
Fig. 1
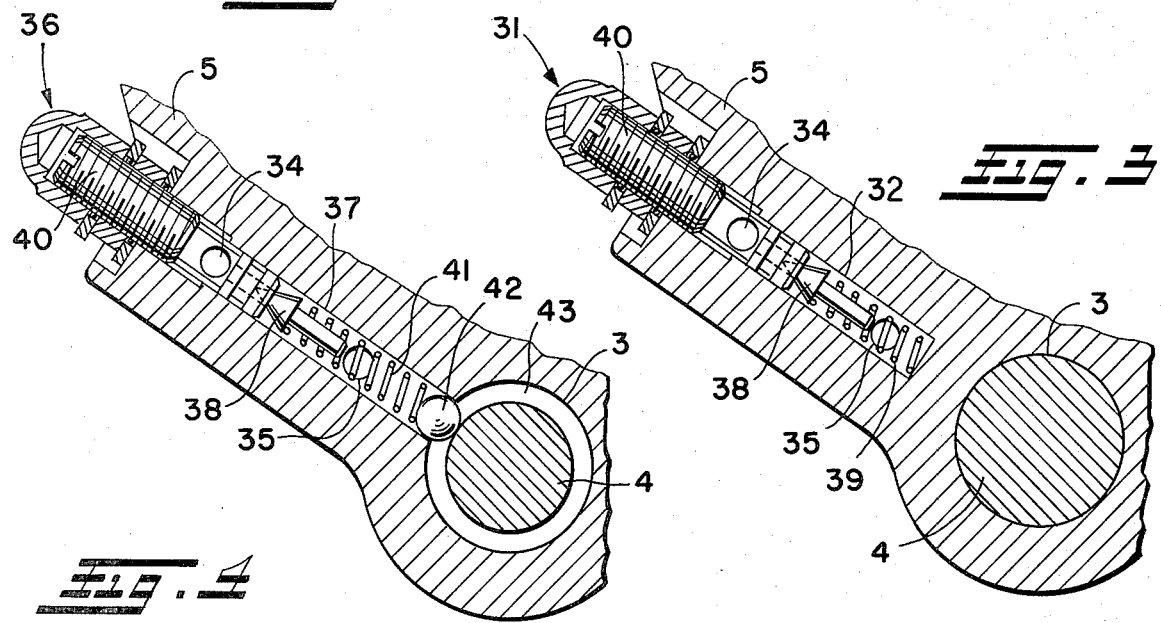
Fig. 2
Fig. 3

MOBILE POWER STEERING SYSTEM

BACKGROUND OF THE INVENTION

In mobile power steering systems it is known to employ a variable displacement pump whose displacement is varied according to the demand as set by the size of the variable area orifice of the steering control valve. However, in such systems the steering response does not vary according to the ground speed of the vehicle and hence the pump displacement control responds to the same variable area orifice pressure drop whether the vehicle is standing still or travelling.

SUMMARY OF THE INVENTION

The mobile power steering system herein embodies a spring loaded pump control modulator which responds to the pressure drop of a variable area orifice of a steering cylinder control valve to vary the displacement of a variable displacement pump to satisfy the flow demand of the variable area orifice, and a remote fluid pressure source such as a ground driven fixed displacement pump which progressively decreases the modulator spring load as the vehicle speed increases.

Other objects and advantages will appear from the ensuing description.

BRIEF DESCRIPTION OF THE DRAWING

FIG. 1 is a side elevation view, partly in cross-section, of a variable volume pump which constitutes the fluid pressure source in the present mobile power steering system; and FIGS. 2, 3 and 4 are cross-section views taken substantially along the lines 2—2, 3—3, and 4—4 of FIG. 1.

DETAILED DESCRIPTION OF THE PREFERRED EMBODIMENTS

The pump 1 herein shown by way of illustrative example is an axial piston pump such as that shown in U.S. Pat. No. 3,726,093 in which the displacement is varied by changing the angular position of the swash plate 2, such change in swash plate angle being hydraulically effected by control of fluid pressure in the bore 3 in which the swash plate actuating piston 4 is axially movable. The pump housing 5 has an intake port 6 leading into the intake chamber 7 and has an outlet or delivery port 8 from which fluid under pressure is delivered upon driving of the drive shaft 9 which is journaled in said housing 5 in well known manner.

The pump 1 illustrated in FIGS. 1–4 provides for pressure compensation, auxiliary modulation, and horsepower modulation, all of which functions are accomplished in the unitary pump housing 5.

In the use of the FIGS. 1 through 4 pump 1 as the fluid pressure source of a mobile power steering system, the outlet port 8 may be connected to the inlet port of a steering control valve 10 and, in turn, the motor ports of said control valve 10 will be connected to the steering cylinder 11. The control valve 10 defines therewithin a variable area orifice 12 which is of size depending upon the extent of movement of the valve member thereof to an operating position thus to vary the speed of actuation of the steering cylinder 11 irrespective of load pressure. Accordingly, the pump 1 control should maintain a predetermined pressure drop across such variable area orifice 12.

The pump housing 5 herein is provided with high and low signal passages 14 and 15 which respectively sense the pressures upstream and downstream of such variable area orifice 12, the high signal passage 14 communicating with the outlet port 8 which has pressure line 16 leading to the inlet port of valve 10, and the low signal passage 15 being communicated with the downstream side of the variable area orifice 12 by line 17 as shown. See, also U.S. Pat. No. 3,726,093 and copending U.S. application of John C. Paul, Ser. No. 394,560, filed Sept. 6, 1973.

Within a stepped bore 18 in the pump housing 5 is an auxiliary modulator 19 which is urged to the position shown in FIG. 2 by a spring 20 which is adjusted to initial desired compression by the mechanism 21 to be later described in detail. The high signal pressure in the passage 14 is conducted to the chamber 23 at the right end of modulator 19, and through the modulator bore 24 and orifice 25 into the chamber 26 at the left end of modulator 19 whereby the high signal pressure acts on the annular area A tending to urge the modulator 19 toward the left.

The low signal pressure in the passage 15 is conducted to the chamber 27 of annular area A to tend to move the modulator 19 to the position shown together with the assistance of the spring 20 when the pressure differential between the high and low signals is less than desired predetermined value hence indicating a flow through the variable area orifice 12 less than demanded thereby. Accordingly, the high signal pressure in passage 14 and chamber 23 is conducted to the piston bore 3 via the modulator orifice 28 to move the swash plate actuating piston 4 in displacement increasing direction. When the pump 1 displacement satisfies the flow demand set by the variable area orifice 12, the pressure drop therethrough has increased and, hence the pressure differential in the chambers 23 and 27 has increased whereby the modulator 19 will be urged to the left against the spring 20 with metered bleeding of the piston bore 3 to the drain port 29 via the metering slot 30 in the modulator 19 thus to maintain the pump 1 displacement to satisfy the demanded flow.

The chamber 26 at the left end of the modulator 19 which has communication with the high signal pressure passage 14 via the bore 24 and orifice 25, is normally closed, but under certain conditions of operation of the pump 1, said chamber 26 is communicated with the drain port 29 either by a constant pressure pilot valve assembly 31 (FIG. 3) disposed in a bore 32 which interconnects the parallel bores 34 and 35 leading respectively to the chamber 26 and to the drain port 29 as shown in FIGS. 2 and 3, or by a horsepower control pilot valve assembly 36 (FIG. 4) disposed in a bore 37 which also interconnects the parallel bores 34 and 35.

Referring now to FIGS. 1, 2 and 3 it can be seen that when the high signal pressure in chamber 26 increases to a value sufficient to unseat the pilot valve member 38 against the force of the spring 39, the chamber 26 will be communicated with the drain port 29 via passages 34, 32, and 35 and hence the pressure in the chamber 26 will decrease with respect to the pressure in chamber 23 by reason of the pressure drop across the orifice 25 in the modulator 19 whereby the predominant pressure in chamber 23 acting on the right-hand end of the modulator 19 will force the same toward the left to bleed the swash plate piston chamber 3 through slot 30 thus to decrease the capacity of the pump 1. When the pressure in the modulator chamber 26 decreases below such predetermined value the pilot valve member 38 closes whereby the movements of the modulator 19 are then controlled by the high signal and low signal pressure differentials to maintain the flow demanded by the variable area orifice 12 associated with the directional control valve 10. The constant pressure pilot valve 31 comprises a body 40 having adjustable screw threaded engagement with the pump housing and is provided with a seat with which the pilot valve member 38 is engaged. By reason of the screw threaded engagement of the body 40 in the pump housing 5, the compression of the spring 39 may be adjusted to vary the opening pressure of the pilot valve member 38.

With reference to FIGS. 1, 2 and 4 the horsepower control pilot valve 36 is similar to the constant pressure pilot valve 31 in that it also comprises a body 40 having an adjustable screw threaded connection with the pump housing 5 and is provided with a seat engaged by the pilot valve member 38. In this case, the spring 41 is compressed between the pilot valve member 38 and a ball 42 which has engagement with a cam surface 43 on the swash plate piston 4, the cam surface 43 being shaped to provide desired characteristics in the horsepower curve of the pump 1. As the displacement of the pump 1 decreases i.e. as the swash plate piston 4 moves toward the right as viewed in FIG. 1, the ball 42 is urged radially outward (see FIG. 4) to increase the compression of the spring 41 and thus to increase the pressure at which the horsepower control pilot valve member 38 opens, and as just described in connection with the constant pressure pilot valve 31, the opening of the horsepower control pilot valve 36 will communicate the modulator chamber 26 with the drain port 29 via passages 34, 37, and 35 whereby the modulator 19 can then again move to the left as viewed in FIG. 2 to bleed off the pressure in the chamber 3 of the swash plate piston 4. It is to be understood that the cam surface 43 may be provided with a straight taper as shown or a concave or convex taper to provide any desired characteristics in the horsepower curve of the pump 1.

Referring now in detail to the mechanism 21 which provides for variable ratio steering control, the same comprises a body 45 adjustably screw connected to the pump housing 5 and having a spring 20 follower 46 urged by spring 47 to a stop position engaged with body 45. The follower 46 and body 45 define chambers 48 and 49 which have ports 50 and 51 which are connected to the delivery line 52 of a fixed displacement ground-driven pump 53 respectively upstream and downstream of an orifice 54. The spring 47 follower 56 is adjustably screw-connected to body 45 for adjustment of the load of spring 47 on follower 46 to overcome the load of the modulator spring 20. By way of illustrative example, when the vehicle is at a standstill or travelling at very low speed (zero or small output of the ground-driven pump 53) there is a zero or very small pressure drop across the orifice 54 and hence there are substantially equal pressures in the chambers 48 and 49 whereby the modulator 19 will adjust the pump 1 to maintain, say, a 200 psi pressure drop across the variable area orifice 12. On the other hand, as the vehicle speed increases with increased flow from the pump 53 through the orifice 54, the increasing pressure differential in the chambers 48 and 49 will urge the follower 46 to the left to progressively decrease the load of the spring 20 on the modulator 19 whereby the capacity of the pump 1 will be progressively decreased to maintain a progressively decreasing pressure drop across the variable area orifice 12. Again, by way of illustrative example, the modulator 19 may respond to maintain a 50 psi pressure drop across the variable area orifice 12 at maximum ground speed of the vehicle.

It is to be understood that the pressure differential in the chambers 48 and 49 may be obtained from a remote source other than the ground-driven pump 53 to vary the loading of the modulator spring 20 and thus to provide a variable steering ratio which is greatest at zero or low vehicle speeds and which is progressively smaller at increasing vehicle speeds.

The embodiments of the invention in which an exclusive property or privilege is claimed are defined as follows:

1. A power steering system for mobile equipment and the like comprising a variable displacement pump, a steering control valve, and a steering cylinder operatively interconnected whereby fluid under pressure delivered by said pump is conducted to said cylinder via a variable area orifice in said control valve; said pump comprising a housing defining high and low fluid pressure zones, and a fluid pressure actuated member in said housing having restricted communication with said high pressure zone operative to vary the displacement of said pump; said housing having high and low signal passages sensing fluid pressures respectively upstream and downstream of said variable area orifice; a valve member movable in said housing between positions opening and closing a bleed passage from said fluid pressure actuated member to said low pressure zone; said valve member having opposite areas thereof exposed respectively to fluid pressure in said high and low signal passages; spring means in said housing biasing said valve member to bleed passage closing position except when the effect of the pressure differential in said passages on said valve member overcomes the biasing force of said spring means at which time said valve member is moved to bleed passage opening position to bleed fluid pressure acting on said fluid pressure actuated member to said low pressure zone for movement thereof to decrease the displacement of said pump; a remote source of fluid pressure; and a fluid pressure actuated follower actuated by said source and engaged with said spring means to vary the biasing force of said spring means on said valve member.

2. The system of claim 1 wherein said remote source is responsive to increasing ground speed of said equipment to progressively decrease the biasing force of said spring means on said valve member.

3. The system of claim 1 wherein said remote source comprises another pump driven in accordance with the ground speed of said equipment to actuate said follower to progressively decrease the biasing force of said spring means on said valve member as the ground speed of the equipment progressively increases.

4. The system of claim 3 wherein the delivery of said another pump is conducted through an orifice; said follower having opposite areas exposed respectively to fluid pressure upstream and downstream of said orifice.

5. The system of claim 1 wherein said follower comprises a piston reciprocable in a cylinder secured to said pump housing; said piston being spring biased to a stop position from which said follower is retracted by increase of fluid pressure from said remote source to decrease the biasing force of said spring means on said valve member.

6. The system of claim 5 wherein said cylinder is adjustably secured to said housing to vary the bias force of said spring means on said valve member when said follower is in said stop position.

7. The system of claim 1 wherein said valve member has other opposed areas respectively exposed to fluid pressure in said high pressure zone and to fluid pressure in said high pressure zone via orifice means; and wherein a pressure compensating pilot valve opens the last-mentioned area to said low pressure zone upon increase of fluid pressure in said high pressure zone to predetermined value whereby the predominant fluid pressure acting on the first-mentioned of said other opposed areas urges said valve member to bleed passage opening position again to bleed the fluid pressure actuated member to said low pressure zone for decreasing the capacity of said pump.

8. The system of claim 7 wherein a horsepower compensating pilot valve similarly effects movement of said valve member to bleed passage opening position responsive to predetermined increase of fluid pressure in said high pressure zone, said horsepower compensating pilot valve including a spring biased pilot valve member having a spring follower engaged with a cam surface on said fluid pressure actuated member to increase the spring force on said pilot valve member as said fluid pressure actuated member moves in displacement decreasing direction.

* * * * *